Oct. 24, 1939.   A. W. KNISLEY   2,176,907
GUN MOUNTING FOR AIRCRAFT
Filed Oct. 31, 1935   2 Sheets-Sheet 2
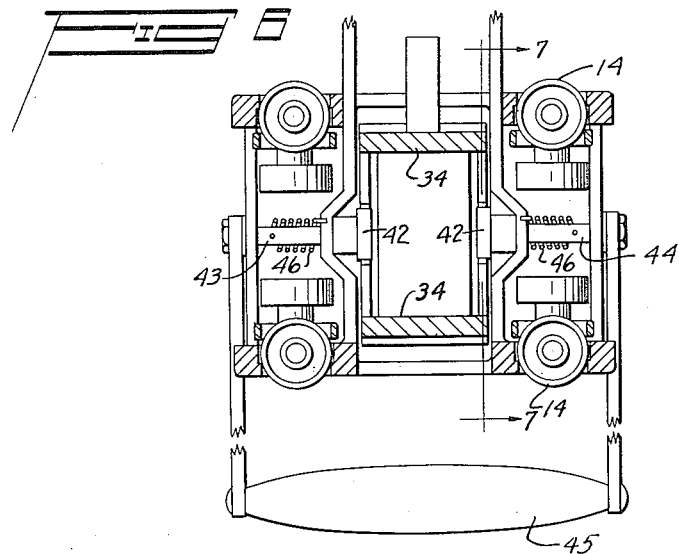
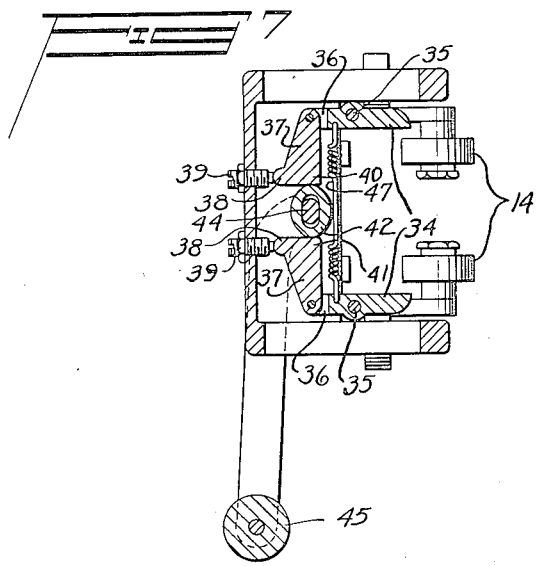
INVENTOR
ANDREW WARD KNISLEY
BY
ATTORNEYS Patented Oct. 24, 1939

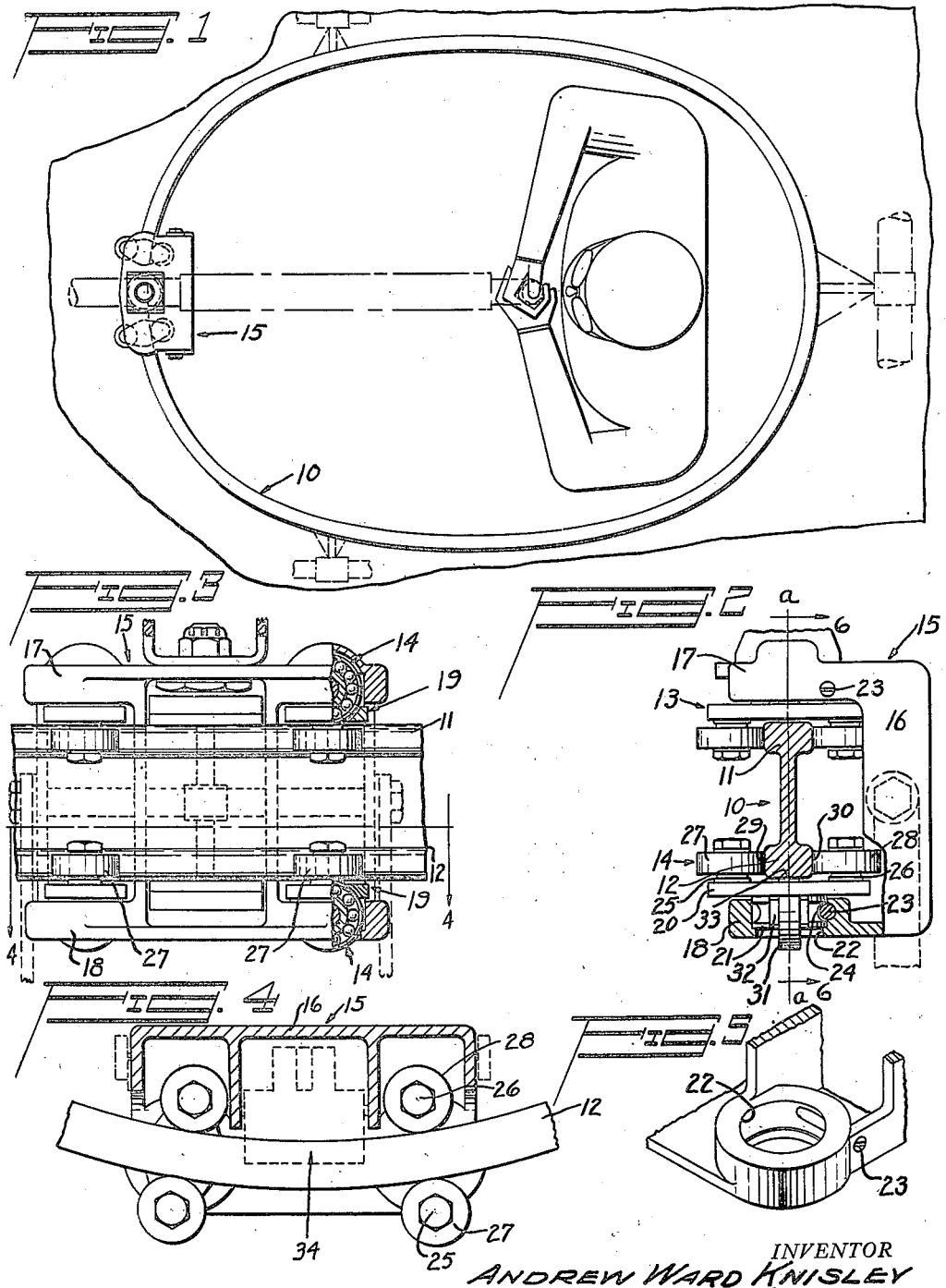

2,176,907

UNITED STATES PATENT OFFICE 2,176,907

GUN MOUNTING FOR AIRCRAFT

Andrew Ward Knisley, Dayton, Ohio

Application October 31, 1935, Serial No. 47,671

9 Claims. (Cl. 89—37.5)

(Granted under the act of March 3, 1883, as
amended April 30, 1928; 370 O. G. 757)

The invention described herein may be manufactured and used by or for the Government for governmental purposes, without the payment to me of any royalty thereon.

The present invention relates to improvements in machine gun mounts particularly adapted for use on aircraft, the improved gun mount being especially designed for mounting upon the top of the fuselage of an airplane. Generally, the invention has reference to a simple and compact rotary support of an economical and practical nature which can be quickly and easily assembled and disassembled.

Many disadvantages have been found to exist in machine gun mounts which have been in general use in the past. The conventional gun turrets used on airplanes in the prior practice have been limited in most instances to tracks of circular shape which have made it extremely difficult to obtain efficient streamlining of the gunner's cockpit due to the necessity of the mounting arrangement of the track arising from its particular shape.

The present invention aims to overcome the objections above-noted and at the same time to provide a novel control for shifting the gun's position by the operator, which same can be instantly accomplished and with ease to the operator.

The primary object of the present invention is to provide a mount for machine guns, or the like, which will allow of greater facilities in ranging and firing of the gun than has been possible in the prior practice, especially without exposing the gunner's body any more than is necessary.

A still further object of the present invention is to provide in a gun mount of this character a supporting ring or track upon which the gun is mounted and supported by means of a carrier or mounting member, said mounting member incorporating pairs of rollers mounted for pivotal turning movement therein in a manner such as to enable the rollers to follow the contour of the supporting ring or track.

A further object of the present invention is to provide a gun mounting of improved rigidity and simple construction applicable to non-circular as well as circular tracks, overcoming the difficulties which arise from changes in curvature of parts of the tracks that the rollers contact with at different positions of the mounting member and which arise from the necessity of rigidly supporting the mounting member in all positions in order to eliminate as far as possible vibration of the mounting member when firing the gun.

According to this invention, the aircraft gun mounting comprises a single supporting rail incorporating upper and lower similar track portions of continuous form arranged about a common axis, upper and lower pairs of rollers mounted to run around said track portions, and a standard carried by said rollers and movable therewith around said tracks. With this construction, the upper and lower ends of the standard run around the circular tracks and thus the standard will always be at the same angular relationship to said common axis at any position of azimuth adjustment so that it will not tend to creep or run to any particular points on the track and will permit freedom of movement of the operator within the cockpit.

Moreover, with non-circular tracks, all difficulties due to changes in curvature of the tracks are avoided by mounting the rollers to turn like "bogies" which permit the rollers running around said tracks to accommodate themselves to any change in curvature without changing the angular relationship to the standard with respect to the tracks, by reason of which, with parallel tracks, the standard does not tend to creep or run to any particular points of the track. The term "tracks of continuous form" includes circular tracks, non-circular continuous curved tracks and a combination of straights and curves.

A still further object of the present invention is to provide in a gun mount of this character braking means for holding the standard to the tracks in any position of angular adjustment, said means incorporating a single hand-operated control lever adapted to readily effect a release of the standard or carriage from the supporting ring or rail.

With the above and other objects in view, the invention consists in the novel construction, combination and arrangement hereinafter fully described, illustrated and claimed.

In the drawings:

Fig. 1 is a top plan view of the gun mount and the supporting rail as installed in the gun turret of an airplane;

Fig. 2 is a side elevation of the gun standard with the mounting means for the rollers illustrated partially in section;

Fig. 3 is a front elevation of Fig. 2;

Fig. 4 is a sectional view taken on the line 4—4 of Fig. 3;

Fig. 5 is a detailed view of one arm of the gun standard with the locking pin in assembled relation thereon;

Fig. 6 is a sectional view taken on the line 6—6 of Fig. 2;

Fig. 7 is a sectional view taken on the line 7—7 of Fig. 6.

Referring more particularly to the drawings wherein corresponding parts are designated by like numerals throughout the several views thereof, the gun mount in the present preferred embodiment of my invention comprises generally a supporting ring or rail generally indicated by the numeral 10 incorporating an upper track 11 and a lower track 12. As shown more particularly in Figs. 1 and 2, the tracks 11 and 12, respectively, are of the same elliptical shape and are mounted about a common axis represented by the dot-dash line a—a.

An upper set of rollers 13 is mounted to run on the upper track 11 and a lower set of rollers 14 is mounted to run on the lower track 12. By these sets of rollers there is carried a gun standard 15 which is movable with the rollers around the track. This gun standard is generally U-shaped and comprises a main body portion 16 positioned within the inner limits of the supporting rail and integral upper and lower arm portions 17 and 18, respectively, which extend outwardly from the main body portion and are adapted to embrace the supporting rail 10, as shown more particularly in Figs. 2 and 4.

Since the sets of rollers heretofore mentioned are mounted in opposed relationship in these arm portions in exactly the same manner, it is necessary merely to describe the method of mounting of the lower set of rollers, which set and its mounting means are shown in greater detail in the sectioned portion of Fig. 2. As shown therein, I provide a mounting member 19 comprising a base plate 20 and a central journal portion 21 mounted for pivotal turning movement along the axis a—a within a circular opening 22 formed in the arm portion 18. This journal portion 21 is held against axial movement within the circular opening 22 by means of a locking pin 23 offset with respect to the axis a—a and adapted to engage within an annular groove 24 formed in the journal portion 21. The base plate 20 carries a pair of spaced and circular axles 25 and 26 carrying rollers 27 and 28 mounted to roll on the front and back faces 29 and 30 of the track 12. A third roller 31 is provided, the axle 32 of which is disposed at right angles to the axles 25 and 26 and fixed in bifurcations on the one end of the journal member 21 so that it rolls along the lower surface 33 of the track 12.

Since the upper and lower sets of rollers are mounted in opposing relation with respect to the upper and lower tracks of the rail 10 in the manner aforesaid, it will be apparent that the gun standard will not only always be at the same angular relation to the common axis of the tracks but the rollers are permitted to readily accommodate themselves to any changes in track curvature and thus allow of greater facilities in ranging and firing the gun.

In order to hold the standard stationary when firing the gun, I make use of a pair of clamping members indicated by the numeral 34, said clamping members being connected by pivots 35 to the arm portions 17 and 18, respectively, of the gun standard. As will be noted by referring to Fig. 7, these clamping members extend over and embrace the upper and lower track portions of the supporting ring or rail 10. The inner ends 36 of these clamping members are pivotally connected to toggle joint links 37. These links are arranged to extend toward one another in opposing relationship, each being provided with a projecting lug portion 38 which contacts the set screws 39 engaged in threaded openings in the body portion of the gun standard. By turning the screws 39 to move the screws inwardly, wear may be compensated for between the clamping members and the supporting ring 10. The free ends of the toggle joint links 37 are provided with lips 40 and 41 which are engaged by a pair of floating cams 42 carried by transversely extending stub shafts 43 and 44 suitably journaled in the body portion of the gun standard. The outer ends of the stub shafts 43 and 44 extend through the sides of the body portion of the gun standard and have conveniently attached thereto a handle indicated by the numeral 45 which depends downwardly and in the normal position is out of the way of the gun. As shown more particularly in Fig. 6, coiled springs 46 are mounted intermediate the ends of the stub shafts 43 and 44 and have their one end attached respectively to said shafts and their other ends securely anchored to the body portion of the gun standard in a manner such as to normally maintain the release handle in a downward position. It should also be noted that the clamping members have secured therebetween, as shown more particularly in Fig. 7, a secondary spring 47 in order that the lips 40 and 41 will at all times be in operative engagement with the floating cam 42. Moving the handle 45 outwardly and upwardly around its pivots tends to release the clamping member to enable the gun carriage to be movable longitudinally along the supporting ring 10. Upon releasing the handle, the clamping members are restored to their clamping position through the action of the springs 46. Thus, by means of a single control handle located on the gun standard, where a greater leverage is obtained for moving the standard along its supporting rail, either the gun support or the standard may be readily released to permit the gunner to swing the gun into any desired firing position.

The several features of the present invention are not limited to the precise construction and arrangement of the device described, and it is to be understood that many modifications and changes may be made therein without departing from the spirit of this invention or of the scope of the appended claims.

What I claim is:

1. An aircraft gun mount comprising, a continuous rail having upper and lower similar tracks of changing radius of curvature, said tracks being parallelly arranged, upper and lower sets of journalled rollers mounted to run around said tracks, each set including a pair of rollers on opposite sides of its corresponding track and pivotal mounting means for each set of rollers enabling said sets of rollers to accommodate themselves to changes in curvature at different parts of said tracks.

2. An aircraft gun mount comprising, a continuous rail having upper and lower similar tracks of changing radius of curvature, said tracks being parallelly arranged, a pair of upper sets and a pair of lower sets of journalled rollers mounted to run around said tracks, each set including a pair of rollers on opposite sides of its corresponding track and pivotal mounting means for each set of rollers enabling said sets of rollers to accommodate themselves to changes in curvature at different parts of said tracks.

3. An aircraft gun mount comprising, a continuous rail having upper and lower similar tracks of changing radius of curvature, said tracks being parallely arranged, upper and lower sets of journalled rollers mounted to run around said tracks, each set including three rollers arranged for rolling contact with correspondingly arranged surfaces of a corresponding track and pivotal mounting means for each set of rollers enabling said sets of rollers to accommodate themselves to changes in curvature at different parts of said tracks.

4. An aircraft gun mount comprising, a continuous rail having upper and lower similar tracks of changing radius of curvature, said tracks being parallely arranged, a pair of upper sets and a pair of lower sets of journalled rollers mounted to run around said tracks, each set including three rollers arranged for rolling contact with correspondingly arranged surfaces of a corresponding track and pivotal mounting means for each set of rollers enabling said sets of rollers to accommodate themselves to changes in curvature at different parts of said tracks.

5. A gun carriage adapted for use in a gun mount having a continuous rail that is provided with upper and lower similar tracks of changing radius of curvature comprising, in combination, a gun standard, upper and lower swivelling-trucks carried by said gun standard, each truck having a plurality of rollers mounted and arranged in such a manner as to be capable of receiving a corresponding rail therebetween and of having complementary rolling contact with correspondingly arranged surfaces thereof.

6. A gun carriage adapted for use in a gun mount having a continuous rail that is provided with upper and lower similar tracks of changing radius of curvature comprising, in combination, a gun standard, a pair of upper and a pair of lower swivelling-trucks carried by said gun standard, each truck having a plurality of rollers mounted and arranged in such a manner as to be capable of receiving a corresponding rail therebetween and having complementary rolling contact with correspondingly arranged surfaces thereof.

7. A gun carriage adapted for use in a gun mount having a continuous rail that is provided with upper and lower similar trucks of changing radius of curvature comprising, in combination, a gun standard, upper and lower swivelling trucks carried by said gun standard, each truck having a pair of rollers rotatable about spaced parallel axes, and a third roller rotatable about an axis normal to said parallel axes, the whole being so arranged as to be capable of receiving a corresponding rail therebetween and of having complementary rolling contact with correspondingly arranged surfaces thereof.

8. A gun carriage adapted for use in a gun mount having a continuous rail that is provided with upper and lower similar tracks of changing radius of curvature comprising, in combination, a gun standard, upper and lower swivelling-trucks carried by said gun standard, each truck having a pair of rollers rotatable about axes that are parallel and symmetrical with respect to the axis of rotation of said truck, and a third roller rotatable about an axis normal to the axis of rotation of said truck, the whole being so arranged as to be capable of receiving a corresponding rail therebetween and of having complementary rolling contact with correspondingly arranged surfaces thereof.

9. A gun carriage adapted for use in a gun mount having a continuous rail that is provided with upper and lower similar tracks of changing radius of curvature comprising, in combination, a gun standard, upper and lower swivelling-trucks carried by said gun standard, each truck having a pair of rollers rotatable about axes that are parallel and symmetrical with respect to the axis of rotation of said truck, and a third roller rotatable about an axis normal to the axis of rotation of said truck, and lying in the plane including said parallel axes, the whole being so arranged as to be capable of receiving a corresponding rail therebetween and of having complementary rolling contact with correspondingly arranged surfaces thereof.

ANDREW WARD KNISLEY.